(12) United States Patent
Young

(10) Patent No.: US 9,296,326 B1
(45) Date of Patent: Mar. 29, 2016

(54) SYSTEM AND METHOD FOR COLLECTING RECYCLING MATERIALS

(71) Applicant: Tim Young, Modesto, CA (US)

(72) Inventor: Tim Young, Modesto, CA (US)

(*) Notice: Subject to any disclaimer, the term of this patent is extended or adjusted under 35 U.S.C. 154(b) by 0 days.

(21) Appl. No.: 14/588,713

(22) Filed: Jan. 2, 2015

(51) Int. Cl.
| | |
|---|---|
| *G06F 19/00* | (2011.01) |
| *B60P 1/28* | (2006.01) |
| *B60P 1/34* | (2006.01) |
| *B60P 1/48* | (2006.01) |
| *B60P 3/00* | (2006.01) |
| *B66F 9/075* | (2006.01) |
| *B66F 9/12* | (2006.01) |
| *B66F 9/18* | (2006.01) |

(52) U.S. Cl.
CPC . *B60P 1/283* (2013.01); *B60P 1/34* (2013.01); *B60P 1/483* (2013.01); *B60P 3/00* (2013.01); *B66F 9/0755* (2013.01); *B66F 9/0759* (2013.01); *B66F 9/07504* (2013.01); *B66F 9/125* (2013.01); *B66F 9/183* (2013.01); *B66F 2700/09* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,313,707 | A * | 2/1982 | Bingman | .................. | B65F 3/08 414/409 |
| 4,868,796 | A * | 9/1989 | Ahrens | ...................... | B65F 3/04 367/96 |
| 5,525,022 | A * | 6/1996 | Huntoon | ................. | B65F 3/001 414/408 |
| 5,565,846 | A * | 10/1996 | Geiszler | ................ | B65F 1/1484 177/139 |
| 5,702,225 | A * | 12/1997 | Ghibaudo | ................. | B65F 3/08 414/408 |
| 5,775,867 | A * | 7/1998 | Christenson | .......... | B65F 33/046 294/3 |
| 5,863,086 | A * | 1/1999 | Christenson | .............. | B65F 3/04 294/106 |
| 6,309,164 | B1 * | 10/2001 | Holder | .................. | B65F 1/1452 414/399 |
| 7,018,155 | B1 * | 3/2006 | Heberling | ............. | B62B 3/0606 414/408 |
| 7,398,789 | B1 * | 7/2008 | Herrera | ................. | B08B 9/0826 134/166 R |
| 7,831,352 | B2 * | 11/2010 | Laumer | ..................... | B65F 3/06 298/22 R |
| 8,998,555 | B1 * | 4/2015 | Ingham | ................. | B65F 3/0203 414/408 |
| 2002/0117380 | A1 * | 8/2002 | Downs | ................. | B25J 15/0253 198/750.11 |
| 2002/0154973 | A1 * | 10/2002 | Bradshaw | ............... | B65F 3/041 414/408 |
| 2004/0206675 | A1 * | 10/2004 | Okamoto | .................. | B03B 9/06 209/421 |
| 2005/0095096 | A1 * | 5/2005 | Curotto | .................... | B65F 1/122 414/406 |
| 2005/0110330 | A1 * | 5/2005 | Khan | ....................... | B60P 1/006 298/22 R |
| 2008/0048872 | A1 * | 2/2008 | Frank | ...................... | G01T 1/167 340/600 |
| 2008/0089764 | A1 * | 4/2008 | Vistro | ................... | B65F 3/0213 414/408 |
| 2008/0228323 | A1 * | 9/2008 | Laumer | ..................... | B65F 3/06 700/285 |

(Continued)

FOREIGN PATENT DOCUMENTS

| | | | | |
|---|---|---|---|---|
| EP | 1020375 A1 * | 7/2000 | ................ | B65F 3/04 |
| WO | WO 9529456 A1 * | 11/1995 | | |

*Primary Examiner* — Jonathan L Sample
(74) *Attorney, Agent, or Firm* — Barry Choobin; Patent 360 LLC

(57) ABSTRACT

The embodiments herein provide a forklift truck for collecting recycling materials in a warehouse. The truck comprises an arm mechanism for lifting a recycling container from a baseline, a self-dumping hopper for holding the recycling materials, and an on-board module controlling a movement of the arm mechanism. The recycling container is configured for storing the recycling materials. The arm mechanism is configured to unload contents of the recycling container in the self-dumping hopper. The on-board module comprises a user interface for receiving a plurality of inputs from a user; and a controller for controlling the arm mechanism according to the inputs received from the user interface. The arm mechanism comprises the actuators and links for moving the arm mechanism in preset manner to avoid collisions based on the received signals from the on-board module and the sensors for monitoring a position of the arm mechanism.

9 Claims, 4 Drawing Sheets

(56) References Cited

U.S. PATENT DOCUMENTS

| | | | |
|---|---|---|---|
| 2009/0025378 A1* | 1/2009 | Laumer | B65F 3/06 60/395 |
| 2009/0114485 A1* | 5/2009 | Eggert | B66F 9/07545 187/394 |
| 2010/0283584 A1* | 11/2010 | McAllister | B65C 9/1865 340/10.1 |
| 2011/0068954 A1* | 3/2011 | McQuade | G08G 1/20 340/988 |
| 2011/0116899 A1* | 5/2011 | Dickens | B65F 3/048 414/21 |
| 2012/0242481 A1* | 9/2012 | Gernandt | G06K 19/0705 340/539.13 |
| 2013/0087562 A1* | 4/2013 | Thukral | B65D 55/14 220/210 |
| 2014/0133944 A1* | 5/2014 | Pangrazio | B66F 9/0755 414/667 |
| 2014/0340197 A1* | 11/2014 | Flood | G06K 7/0004 340/5.81 |
| 2014/0343801 A1* | 11/2014 | Whitfield, Jr. | G06Q 10/30 701/49 |
| 2015/0142279 A1* | 5/2015 | Goedken | B65F 3/04 701/50 |

* cited by examiner

SYSTEM AND METHOD FOR COLLECTING RECYCLING MATERIALS

BACKGROUND

1. Technical Field

The embodiments herein generally relate to waste disposal and recycling systems and particularly relate to waste collecting and disposing vehicle. The embodiments herein more particularly relate to a user controlled waste collecting vehicle.

2. Description of the Related Art

In the present scenario, most of the companies recycle the generated waste materials in order to reduce their carbon footprint. These industrial, commercial and large residential recycling wastes are collected from different locations and transported to a central location. Normally, the waste collectors are sent from a central location and dispatched to the different locations.

Generally a warehouse operation is performed by an operator, who is intended to drive a Forklift truck through the warehouse. The operator stops the truck at a recycling container and step down from the Forklift to collect the recycling container. The operator carries the recycling container and dumps the contents of the container into a dumping chamber of the truck. Once the contents are dumped, the operator carries back the container to its original position and drives the Forklift to the next recycling container. Approximately, the operator clears around 50-200 recycling containers per shift. For large organizations, this process is a very complicated task as it requires a large number of operators for collecting and transporting the trash and recyclables.

Hence there is a need for a system for collecting the recycling wastes. Further there is a need for a manually controlled waste collection recovery vehicle. Still further, there is further need for a waste collecting system which reduces the manpower requirement and lessens the labour of waste-collecting personnel.

The abovementioned shortcomings, disadvantages and problems are addressed herein and which will be understood by reading and studying the following specification.

OBJECTS OF THE EMBODIMENTS HEREIN

The primary object of the embodiments herein is to provide a waste-loading vehicle for collecting recycling wastes in a warehouse.

Another object of the embodiments herein is to provide a manual, semi-automated, and automated waste collecting vehicle which is controlled by an operator.

Yet another object of the embodiments herein is to provide a refuse collecting vehicle which reduces labour of the operator who handles the working of the vehicle.

Yet another object of the embodiments herein is to provide an ergonomic lifting vehicle which efficiently lifts and empties a recycling container.

These and other objects and advantages of the embodiments herein will become readily apparent from the following summary and the detailed description taken in conjunction with the accompanying drawings.

SUMMARY

The various embodiments herein provide a forklift truck for collecting the recycling materials in a warehouse. The truck comprises an arm mechanism attached for lifting a recycling container from a baseline, a self-dumping hopper for holding the recycling materials, and an on-board module controlling a movement of the arm mechanism. The recycling container is configure for storing the recycling materials. The arm mechanism is configured to unload the contents of the recycling container in the self-dumping hopper.

According to an embodiment herein, the arm mechanism is moved between a first position and a second position. The arm mechanism is shifted to the first position for picking the recycling container placed on the baseline. The arm mechanism is lifted to the second position for emptying the recycling materials of the container into the self-dumping hopper.

According to an embodiment herein, the on-board module further comprises a user interface for receiving a plurality of inputs from a user and a controller for controlling the arm mechanism. The controller operates the arm mechanism based on the inputs received from the user interface.

According to an embodiment herein, the arm mechanism further comprises a plurality of links for providing a variable movement to the arm mechanism, a plurality of actuators associated with the links, a plurality of sensors and a gripper. The links are arranged at different angles so that the arm mechanism is moved in a predetermined order to avoid collisions. The actuators are configured for controlling the movement of the arm mechanism according to a plurality of signals received from the on-board module. The sensors are configured for monitoring a position of the arm mechanism and the recycling container. The gripper is located at an end of the arm mechanism and is configured for clutching the recycling container. Another end of the arm mechanism is fixed to the self-dumping hopper.

According to an embodiment herein, the user interface comprises a plurality of function keys operated by the user, a joystick and a display unit. The function keys are configured for performing a plurality of actions with the arm mechanism. The joystick is used for moving the arm mechanism in a specific direction. The display unit is adopted to display a status of the actions performed on the arm mechanism.

According to an embodiment herein, the function keys and the joystick 5 generates a plurality of commands according to the actions that needs to be performed on the arm mechanism.

According to an embodiment herein, the controller in communication with the user interface is configured to receive the plurality of commands. The controller accordingly generates the plurality of signals to control the movement of the arm mechanism.

According to an embodiment herein, the actuators are in communication with the microcontroller and is configured to receive the signals and accordingly control the plurality of links. The plurality of links are operated to perform a desired action by the arm mechanism.

According to an embodiment herein, the plurality of sensors comprises a proximity sensor and a photoelectric sensor. The proximity sensor is configured for determining a position of the arm mechanism. The proximity sensor identifies the position of arm mechanism by calculating a distance between the arm mechanism and the baseline. The photoelectric sensor is configured for identifying the distance of the recycling container from the forklift truck. The sensor directs a radiation at the container and collects a reflection of the radiation to estimate the distance.

According to an embodiment herein, the sensors are configured to transmit a position data of the arm mechanism and the recycling container to the controller. The controller is further configured for analysing the data to determine the required action that has to be performed on the arm mechanism.

According to an embodiment herein, the controller generates a first signal when the arm mechanism is in the first position at a first instance of time. The actuators receive the first signal to activate the gripper for holding the recycling container.

According to an embodiment herein, the controller transmits a second signal to the actuators. The second signal operates the actuators to lift the arm mechanism from the first position to the second position.

According to an embodiment herein, the controller generates a third signal when the arm mechanism is in the second position. The actuators receive the second signal for tilting the gripper and emptying the contents of the recycling container into the self-dumping hopper.

According to an embodiment herein, the controller generates a fourth signal when the arm mechanism is in the second position. The actuators, on receiving the fourth signal, lower the arm mechanism from the second position to the first position.

According to an embodiment herein, the controller generates a fifth signal when the arm mechanism is in the first position at a second instance of time. The actuators receive the second signal to release the hold of the gripper on the recycling container.

According to an embodiment herein, the display unit is in communication with the controller. The display screen is configured to indicate the position of the arm mechanism as the recycling container is lifted from the first position to the second position.

According to an embodiment herein, the self-dumping hopper is installed at a front side of the truck. The arm mechanism operates on a front loading mechanism.

According to an embodiment herein, the recycling container comprises a means for attaching the recycling container to the arm mechanism.

The various embodiments herein provide a method for operating a forklift truck for collecting recycling materials in a warehouse. The method comprises the steps of receiving the plurality of inputs from a user through the user interface; generating the plurality of signals by the controller depending on the plurality of inputs received from the user interface; actuating the plurality of actuators based on the plurality of signals received from the controller for performing the plurality of actions on the arm mechanism; determining the position of the arm mechanism by the plurality of sensors, when the plurality of actions are performed on the mechanism; and displaying the position of the arm mechanism on the display unit of the user interface.

According to an embodiment herein, the step of performing the plurality of actions by the arm mechanism comprises clasping the recycling container; lifting the container from a first position to a second position; tilting the container for emptying the recycling materials into a self-dumping hopper; lowering the container from the second position to the first position; and releasing the recycling container.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
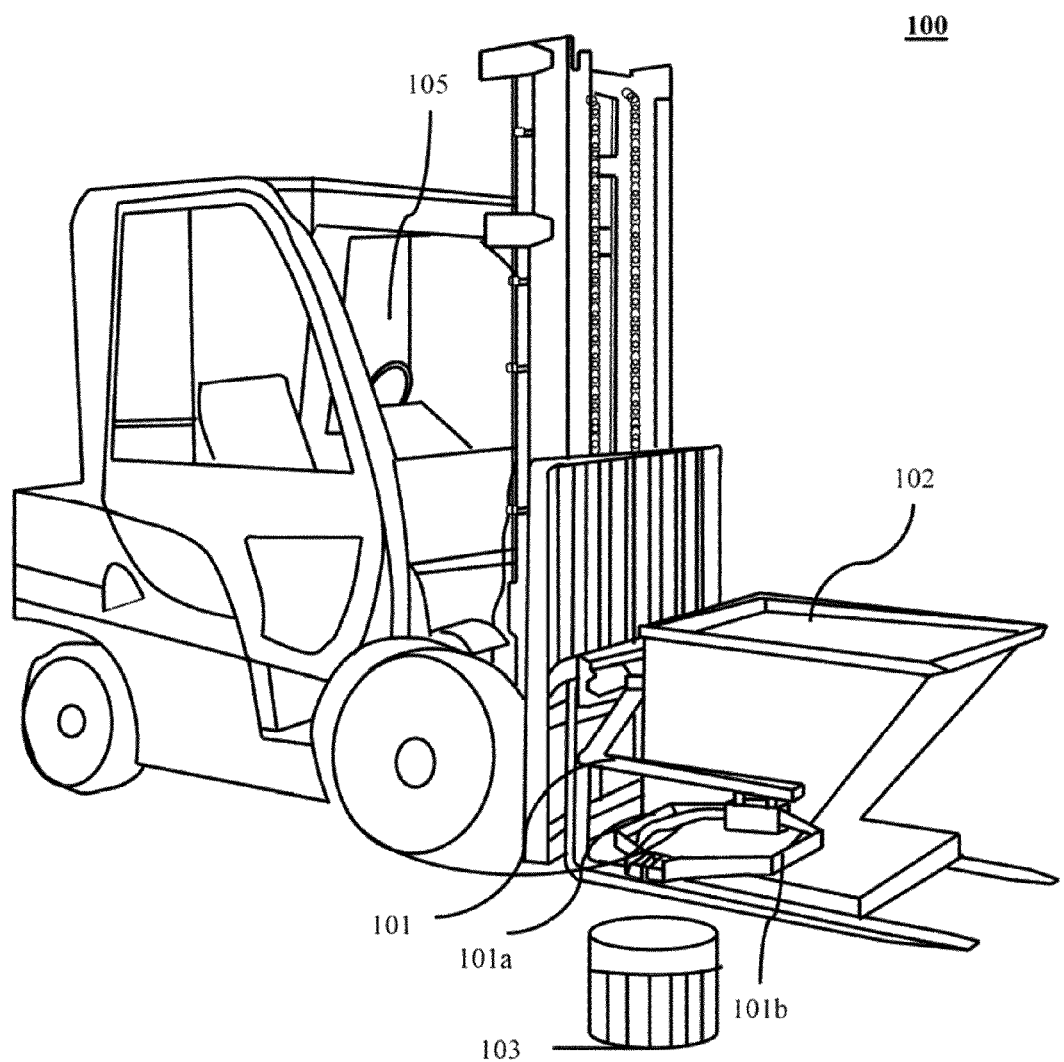
FIG. 1a and FIG. 1b illustrates a side view of a forklift truck used for collecting recycling materials in a warehouse, according to an embodiment herein.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a forklift truck for collecting the recycling materials in a warehouse. The truck comprises an arm mechanism attached for lifting a recycling container from a baseline, a self-dumping hopper for holding the recycling materials, and an on-board module controlling a movement of the arm mechanism. The recycling container is configure for storing the recycling materials. The arm mechanism is configured to unload the contents of the recycling container in the self-dumping hopper.

According to an embodiment herein, the arm mechanism is moved between a first position and a second position. The arm mechanism is shifted to the first position for picking the recycling container placed on the baseline. The arm mechanism is lifted to the second position for emptying the recycling materials of the container into the self-dumping hopper.

According to an embodiment herein, the on-board module further comprises a user interface for receiving a plurality of inputs from a user and a controller for controlling the arm mechanism. The controller operates the arm mechanism based on the inputs received from the user interface.

According to an embodiment herein, the arm mechanism further comprises a plurality of links for providing a variable movement to the arm mechanism, a plurality of actuators associated with the links, a plurality of sensors and a gripper. The links are arranged at different angles so that the arm mechanism is moved in a predetermined order to avoid collisions. The actuators are configured for controlling the movement of the arm mechanism according to a plurality of signals received from the on-board module. The sensors are configured for monitoring a position of the arm mechanism and the recycling container. The gripper is located at an end of the arm mechanism and is configured for clutching the recycling container. Another end of the arm mechanism is fixed to the self-dumping hopper.

According to an embodiment herein, the user interface comprises a plurality of function keys operated by the user, a joystick and a display unit. The function keys are configured for performing a plurality of actions with the arm mechanism. The joystick is used for moving the arm mechanism in a specific direction. The display unit is adopted to display a status of the actions performed on the arm mechanism.

According to an embodiment herein, the function keys and the joystick generates a plurality of commands according to the actions that needs to be performed on the arm mechanism.

According to an embodiment herein, the controller in communication with the user interface is configured to receive the plurality of commands. The controller accordingly generates the plurality of signals to control the movement of the arm mechanism.

According to an embodiment herein, the actuators are in communication with the microcontroller and is configured to receive the signals and accordingly control the plurality of links. The plurality of links are operated to perform a desired action by the arm mechanism.

According to an embodiment herein, the plurality of sensors comprises a proximity sensor and a photoelectric sensor. The proximity sensor is configured for determining a position of the arm mechanism. The proximity sensor identifies the position of arm mechanism by calculating a distance between the arm mechanism and the baseline. The photoelectric sensor is configured for identifying the distance of the recycling container from the forklift truck. The sensor directs a radiation at the container and collects a reflection of the radiation to estimate the distance.

According to an embodiment herein, the sensors are configured to transmit a position data of the arm mechanism and the recycling container to the controller. The controller is further configured for analysing the data to determine the required action that has to be performed on the arm mechanism.

According to an embodiment herein, the controller generates a first signal when the arm mechanism is in the first position at a first instance of time. The actuators receive the first signal to activate the gripper for holding the recycling container.

According to an embodiment herein, the controller transmits a second signal to the actuators. The second signal operates the actuators to lift the arm mechanism from the first position to the second position.

According to an embodiment herein, the controller generates a third signal when the arm mechanism is in the second position. The actuators receive the second signal for tilting the gripper and emptying the contents of the recycling container into the self-dumping hopper.

According to an embodiment herein, the controller generates a fourth signal when the arm mechanism is in the second position. The actuators, on receiving the fourth signal, lower the arm mechanism from the second position to the first position.

According to an embodiment herein, the controller generates a fifth signal when the arm mechanism is in the first position at a second instance of time. The actuators receive the second signal to release the hold of the gripper on the recycling container.

According to an embodiment herein, the display unit is in communication with the controller. The display screen is configured to indicate the position of the arm mechanism as the recycling container is lifted from the first position to the second position.

According to an embodiment herein, the self-dumping hopper is installed at a front side of the truck. The arm mechanism operates on a front loading mechanism.

According to an embodiment herein, the recycling container comprises a means for attaching the recycling container to the arm mechanism.

The various embodiments herein provide a method for operating a forklift truck for collecting recycling materials in a warehouse. The method comprises the steps of receiving the plurality of inputs from a user through the user interface; generating the plurality of signals by the controller depending on the plurality of inputs received from the user interface; actuating the plurality of actuators based on the plurality of signals received from the controller for performing the plurality of actions on the arm mechanism; determining the position of the arm mechanism by the plurality of sensors, when the plurality of actions are performed on the mechanism; and displaying the position of the arm mechanism on the display unit of the user interface.

According to an embodiment herein, the step of performing the plurality of actions by the arm mechanism comprises clasping the recycling container; lifting the container from a first position to a second position; tilting the container for emptying the recycling materials into a self-dumping hopper; lowering the container from the second position to the first position; and releasing the recycling container.

FIG. 1a illustrates a side view of a forklift truck with waste bin holding arm in closed condition, according to an embodiment herein. The truck 100 comprises a body mounted on a chassis of the truck 100. The chassis of truck 100 comprises a plurality of wheels and a transmission system. The chassis is assembled together with an engine and a drive-train. A driver seat and a steering box is loaded on the chassis of the truck. The entire assembly is enclosed within the body of the truck. The truck 100 is operated and driven by a user. The truck 100 comprises an arm mechanism 101 which is mounted on the front side of the truck 100. One end of the arm mechanism 101 is engaged with a carrier fixed to the front end of the body. A recycling container 103 holding recycling waste materials is individually placed above a baseline, which is typically a ground plane. The truck 100 is driven to the site where the recycling container 103 is placed so as to collect the recycling materials in the warehouse. The recycling container 103 comprises a means for attaching the container to the arm mechanism 101. The arm mechanism 101 is configured to move and lift the recycling container 103. The self-dumping hopper 102 is installed at a front side chassis of the truck 100. The self-dumping hopper 102 is in form of a vessel with a top opening. The arm mechanism 101 operates on a front loading mechanism to unload the contents of the recycling container 103 to the self-dumping hopper 102.

The arm mechanism 101 comprises a plurality of arms 101a and 101b, which are hinged to each other with a plurality of joints. The arms 101a and 101b are adjustable to different angles so as to provide a variable movement to the arm mechanism 101. The arms 101a and 101b are operated to reach the arm mechanism 101 at various places in different directions. According to an embodiment herein, the arms 101a and 101b are controlled by manual, semi-automatic, or automatic modes. The control of the arms 101a and 101b is set by the user. The arm mechanism 101 is moved in a predetermined manner to avoid the collision with any external obstacle. The arms 101a and 101b provides a firm hold on the recycling container 103 so that the arm mechanism 101 is able to lift the container 103 without losing a grip on the container 103. The arms 101a and 101b comprises at least two movable forks/clutches which contract towards each other to grasp on the recycling container 103 and retract away from each other to release the grip on the recycling container 103. The user positions the recycling container 103 between the arms 101a and 101b. Once the recycling container 103 is positioned between the two arms 101a and 101b, the user activates the arm mechanism 101 to grasp on the container 103. On completion of a dumping operation, the recycling container 103 is placed on the baseline and arm 101a and 10b loosens the hold of forks on the container 103.

According to an embodiment herein, the truck 100 includes a driver's cabin 105. The driver's cabin 105 includes a seat where the user sits and drives the truck 100.

Further, according to the embodiments herein, the driver's cabin comprises a user interface control used for controlling the arm mechanism 101. The user in the driver's cabin 105 sets the arm mechanism 101 to be a manual process, a semi-automatic process, or an automatic process. According to an embodiments herein, the arm mechanism is controlled using a joystick. Furthermore, the driver's cabin 105 comprises a display unit for displaying the working of sensors and actuators. For example, the user from the drive's cabin can view the process of the arm mechanism 101 and guide the arms 101a and 101b when the process in in manual configuration.

According to an embodiment herein, the arm mechanism 101 is moved between a first position and a second position. The first position is typically where the arm mechanism engages with the recycling container prior to the container being lifted from the baseline. Accordingly, the second location is typically above the top opening of the self-dumping hopper. The arm mechanism 101 is shifted to the first position for picking the recycling container 103 placed on the baseline. The arm mechanism 101 further transfers the recycling container from the first position to the second position to spill the contents of the container into the top opening of the self-dumping hopper and the container is placed back to the first position. The working of the arm mechanism 101 is controlled by an on-board module which is located on a dashboard of the truck.

Figure 1B:
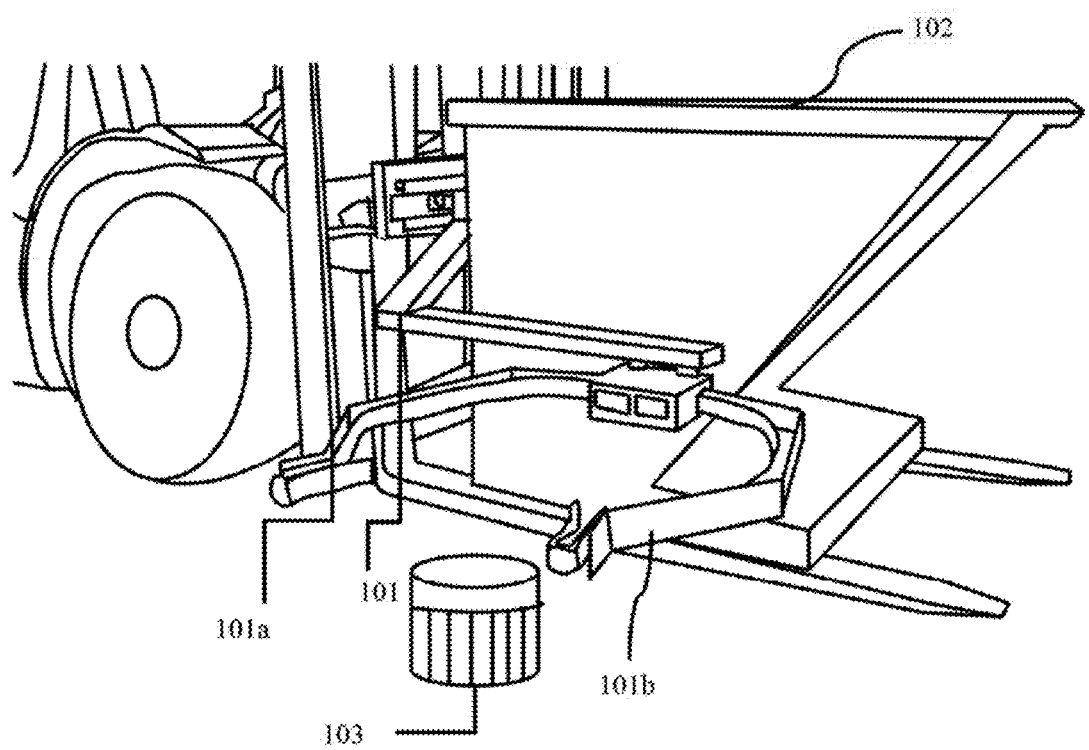

FIG. 1b illustrates a side view of a forklift truck used for collecting recycling materials in a warehouse and with the holding arm/clutch in open condition to receive a waste bin or recycling container, according to an embodiment herein. According to an embodiment herein, the arm 101a and 101b is opened to place the container 103 on the baseline after emptying the contents from the container 103 to the hopper 102. Further, according to other embodiments herein, the arm 101a and 101b is opened to hold the container 103 and to empty the contents of the container 103. The process of holding the container 103 by the arms 101a and 101b is decided by the user. According to the embodiments herein, the process can be manual, semi-automatic, or automatic.

Figure 2:
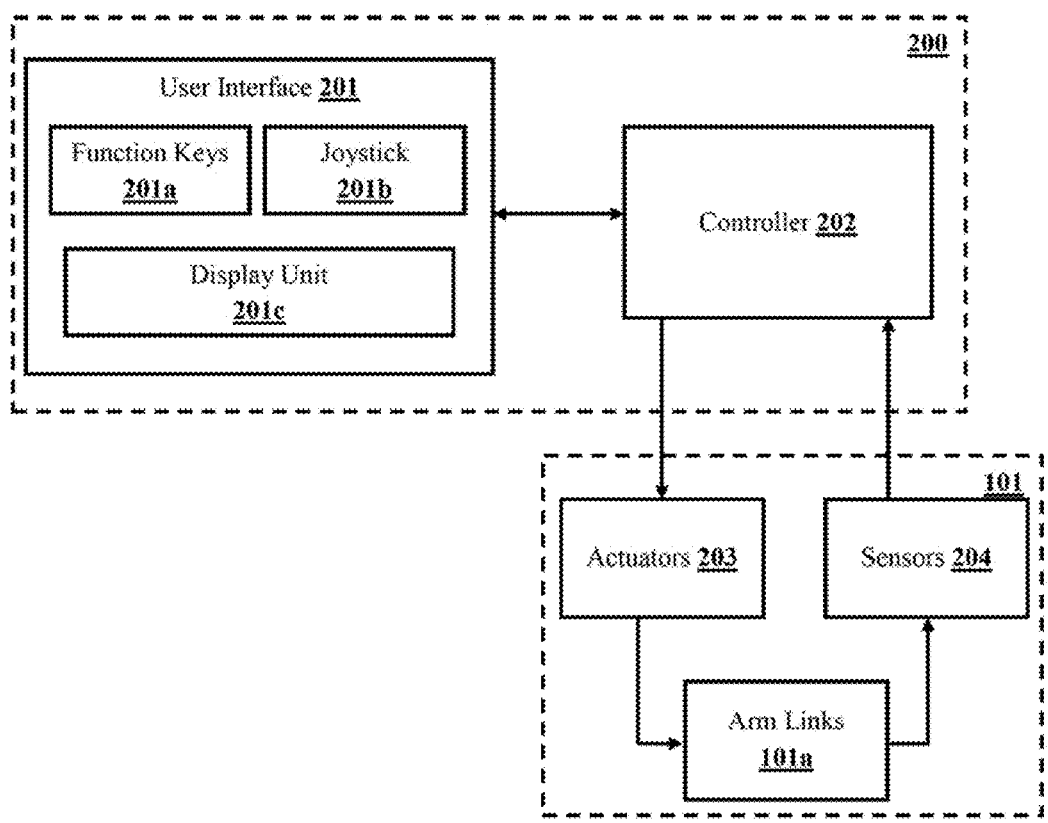
FIG. 2 illustrates a block diagram of control system with an on-board module in communication with an arm mechanism of the forklift truck used for collecting recycling materials in a warehouse, according to an embodiment herein.

FIG. 2 illustrates a block diagram of a control system with an on-board module in communication with an arm mechanism of the forklift truck, according to an embodiment herein. The on-board module 200 is operated by the user for controlling the arm mechanism 101. The on-board module 200 comprises a user interface 201 and a controller 202. The user interface 201 is configured for receiving a plurality of inputs from the user. The user interface 201 further comprises a plurality of function keys 201a and a joystick 201b. The plurality of function keys 201a are configured to perform a plurality of actions on the arm mechanism 101. The user access a particular function key to perform a particular action on the arm mechanism 101. The functions keys 201a are provided to perform the functions including but not restricting to the grasping and releasing of the recycling container by the gripper of the arm mechanism. The joystick 201b is controlled for moving the arm mechanism 101 in various directions. The function keys 201a and the joystick 201b generate a plurality of commands according to the actions that needs to be performed on the arm mechanism 101. The commands are provided to the controller 202. The controller 202 processes the commands to generate a plurality of signals which enable the movement of the arm mechanism 101 according to the commands received. The controller 202 communicates the signals to the arm mechanism 101 by wired/wireless communication link. The arm mechanism 101 comprises a plurality of actuators 203 implemented with the plurality of links 101a, where a particular actuator 203 actuates its associating arms 101a and 101b, upon receiving the signals from the controller 202. The links 101a are operated by a force exerted by a hydraulic, electric, or pneumatic actuator. The arm mechanism 101 further comprises a plurality of sensors 204 communicating with the controller 202. The sensors 204 provide a feedback to the controller 202, based on the position of the arm mechanism 101, when the plurality of actions are performed on the arm mechanism 101. The plurality of sensors 204 comprises a proximity sensor configured to determining a position of the arm mechanism. The proximity sensor identifies the position of arm mechanism 101 by calculating the distance between the arm mechanism and the baseline. The plurality of sensors 204 also comprises a photoelectric sensor, for example IR sensor, which is configured to identify the distance of the recycling container from the forklift truck. The photoelectric sensor directs a radiation at the container and collects a reflection of the radiation to estimate the location of the recycling container. The sensors 204 transmit their estimated data on the position of the arm mechanism 101 and the recycling container to the controller 202. The controller 202 analyses the collected data to determine the required action that has to be performed on the arm mechanism 101. The controller 202 further is connected to a display unit 201c which is configured to indicate the position of the arm mechanism 101 as the recycling container is lifted from the first position to the second position.

According to an embodiment herein, the controller is configured to transmit different signals to different actuators, depending on the actions that are to be performed by the arm mechanism. Primarily, the controller generates at least five signals (S1, S2, S3, S4, and S5) for performing at least five actions on the arm mechanism. On receiving the signal S1, the force is exerted by the actuators on the gripper of the arm mechanism to move the arm mechanism until the forks impact and grasp the recycling container. The positive force exerted by the actuators on the forks of the gripper is such that a positive locked grip is provided on the recycling container which substantially prevents the container from slipping from the gripper. The arm mechanism receives the signal S2 for further generating enough force on the recycling container so that the recycling container is lifted above from the baseline without any substantial slippage of the recycling container. The arm mechanism 101 lifts the recycling container until the container is raised above the top opening of the self-dumping hopper. The controller transmits the signal S3 to tilt the gripper of the arm so that the contents of the recycling container are dropped into the self-dumping hopper. On emptying the recycling container 103, the arm mechanism lowers/moves down the recycling container on to the baseline after receiving the signal S4 from the controller. The grip on the recycling container 103 is released as the actuator of the gripper receives the signal S5 from the controller.

Figure 3:
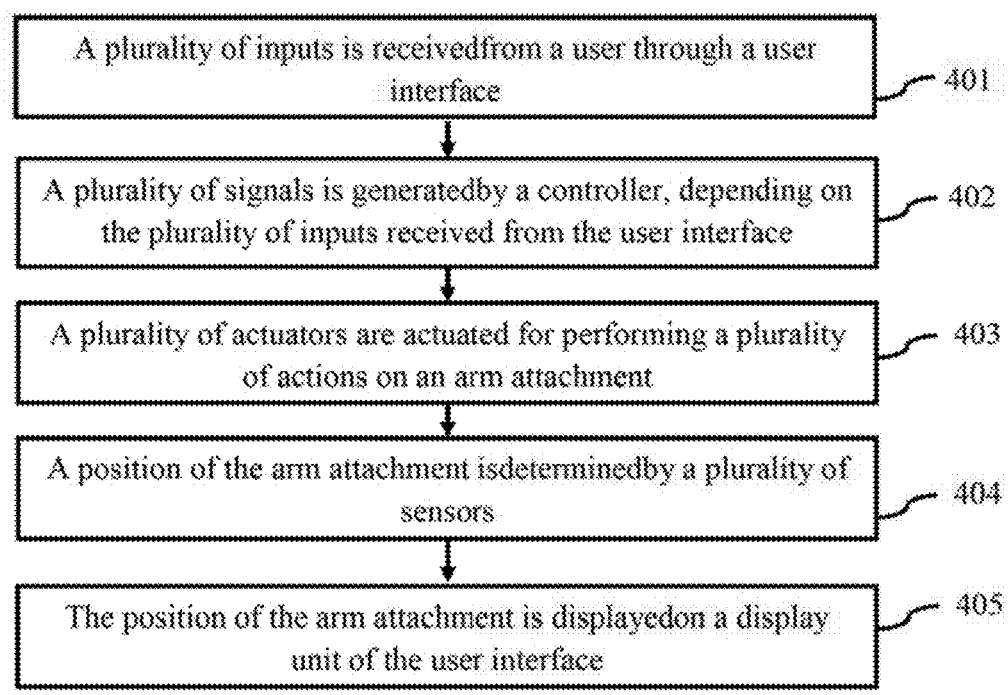
FIG. 3 illustrates a flowchart for a method for operating a forklift truck for collecting recycling materials in a warehouse, according to an embodiment herein.

FIG. 3 illustrates a flowchart explaining the steps involved in a method for operating a forklift truck for collecting recycling materials in a warehouse, according to an embodiment herein. The method comprises steps of receiving the plurality of inputs from the user through the user interface (401). The controller obtains the inputs from the user interface in the form of commands. The controller generates the plurality of signals, depending on the plurality of inputs received from the user interface (402). The signals are transmitted to the plurality of actuators for actuating the arm mechanism to perform the required actions on the recycling container (403). The position of the arm mechanism is estimated by the plurality of sensors and the estimation data is transmitted to the controller (404). Using the data, the position of the arm mechanism is analyzed and the position information in the displayed the display unit of the user interface (405).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A forklift truck for collecting recycling materials in a warehouse, the said forklift truck comprising:
a self-dumping hopper configured for storing collected recycling materials;
an arm mechanism configured for lifting a recycling container from a baseline, and transfer the contents thereof into the self-dumping hopper, said arm mechanism further comprising:
a plurality of arms, said arms arranged at different angles so that the arm mechanism is moved in a predetermined order;
a plurality of actuators associated with links configured for controlling the movement of the arm mechanism;
a gripper located at an end of the arm mechanism for clutching the recycling container, and wherein another end of the arm mechanism is fixed to the self-dumping hopper;
a proximity sensor configured for determining a position of the arm mechanism, wherein the proximity sensor identifies a position of the arm mechanism by calculating a distance between the arm mechanism and the baseline;
a photoelectric sensor configured for identifying a distance between the recycling container and the forklift truck, and wherein the photoelectric sensor directs/transmits a radiation at the container and collects a reflection of the radiation to estimate the distance between the recycling container and the forklift truck;
an on-board module configured for controlling movements of the arm mechanism, said on-board module comprising:
a user interface configured for receiving a plurality of inputs from a user; and
a controller configured for controlling the arm mechanism according to the inputs received from the user interface, said controller configured to generate a plurality of signals in response to the inputs received from the user interface for controlling the movement of the arm mechanism, said controller further configured to move the arm mechanism to predetermined positions based on the signals generated by the controller, wherein the arm mechanism is shifted to a first position for picking up the recycling container placed on the baseline, and wherein the arm mechanism is shifted to a second position for emptying the recycling materials of the container into the self-dumping hopper, said controller further configured to receive from the proximity sensor and the photoelectric sensor, position data corresponding to the arm mechanism and the recycling container, said controller further configured to analyze the position data and determine the action to be performed on the arm mechanism.

2. The forklift truck according to claim 1, wherein the user interface comprises:
a plurality of function keys configured to enable the user to provide inputs for performing a plurality of predetermined actions on the arm mechanism;
a joystick configured to enable the user to provide inputs for moving the arm mechanism in a specific direction; and
a display screen for displaying a status of the actions performed on the arm mechanism.

3. The forklift truck according to claim 1, wherein the actuators communicate with the controller to receive the signals, said actuators further configured to control the plurality of links based on said signals, and wherein the plurality of links are operated to enable the arm mechanism to perform a desired action.

4. The forklift truck according to claim 1, wherein the controller generates a first signal when the arm mechanism is in the first position at a first instance of time, and wherein the actuators receive the first signal to activate the gripper for holding the recycling container.

5. The forklift truck according to claim 1, wherein the controller transmits a second signal to the actuators, and wherein the second signal instructs the actuators to lift the arm mechanism from the first position to the second position.

6. The forklift truck according to claim 1, wherein the controller generates a third signal when the arm mechanism is in the second position, and wherein the actuators receive the third signal for tilting the gripper and emptying the contents of the recycling container into the self-dumping hopper.

7. The forklift truck according to claim 1, wherein the controller generates a fourth signal when the arm mechanism is in the second position, and wherein the actuators lower the arm mechanism from the second position to the first position, on receiving the fourth signal.

8. The forklift truck according to claim 1, wherein the controller generates a fifth signal when the arm mechanism is in the first position at a second instance of time, and wherein the actuators receive the second signal to release the gripper from a hold on the recycling container.

9. The forklift truck according to claim 1, wherein the self-dumping hopper is installed at a front side of the truck, and wherein the arm mechanism operates on a front loading mechanism.

\* \* \* \* \*